United States Patent [19]
Young et al.

[11] Patent Number: 5,771,387
[45] Date of Patent: Jun. 23, 1998

[54] METHOD AND APPARATUS FOR INTERRUPTING A PROCESSOR BY A PCI PERIPHERAL ACROSS AN HIERARCHY OF PCI BUSES

[75] Inventors: Bruce Young, Tigard; Norm Rasmussen, Hillsboro; Brad Hosler, Portland, all of Oreg.

[73] Assignee: Intel Corporation, Santa Clara, Calif.

[21] Appl. No.: 621,128

[22] Filed: Mar. 21, 1996

[51] Int. Cl.[6] .................................................. G06F 9/46
[52] U.S. Cl. ......................... 395/733; 395/306; 395/309
[58] Field of Search .................................. 395/733–742, 395/281, 306, 308, 309, 310

[56] References Cited

U.S. PATENT DOCUMENTS

| | | | |
|---|---|---|---|
| 5,499,346 | 3/1996 | Amini et al. | 395/308 |
| 5,548,730 | 8/1996 | Young et al. | 395/280 |
| 5,568,619 | 10/1996 | Blackledge et al. | 395/281 |
| 5,594,882 | 1/1997 | Bell | 395/421.02 |
| 5,619,706 | 4/1997 | Young | 395/741 |

OTHER PUBLICATIONS

PCI Local Bus Specification, Revision 2.1, PCI Special Interest Group, pp. 8–13, 81–97, Jun. 1, 1995.

*Primary Examiner*—Ayaz R. Sheikh
*Assistant Examiner*—Jigar Pancholi
*Attorney, Agent, or Firm*—Blakely, Sokoloff, Taylor & Zafman

[57] ABSTRACT

A number of remote I/O ICUs, enhanced PCI—PCI bridges, and an ICC bus interface unit are distributively provided to a computer system having a processor and an hierarchy of PCI buses for facilitating PCI agents coupled to the lower level PCI buses to interrupt the processor during operation. The remote I/O ICUs, the enhanced functions of the PCI—PCI bridges, and the ICC bus interface unit advantageously leverage the PCI—PCI bridges' conventional ability in handling PCI type 1 configuration write transactions, to facilitate interrupt delivery and end of interrupt notification, by employing two specially defined PCI type 1 configuration write transactions, one for interrupt messages and another for end-of-interrupt (EOI) messages.

27 Claims, 6 Drawing Sheets

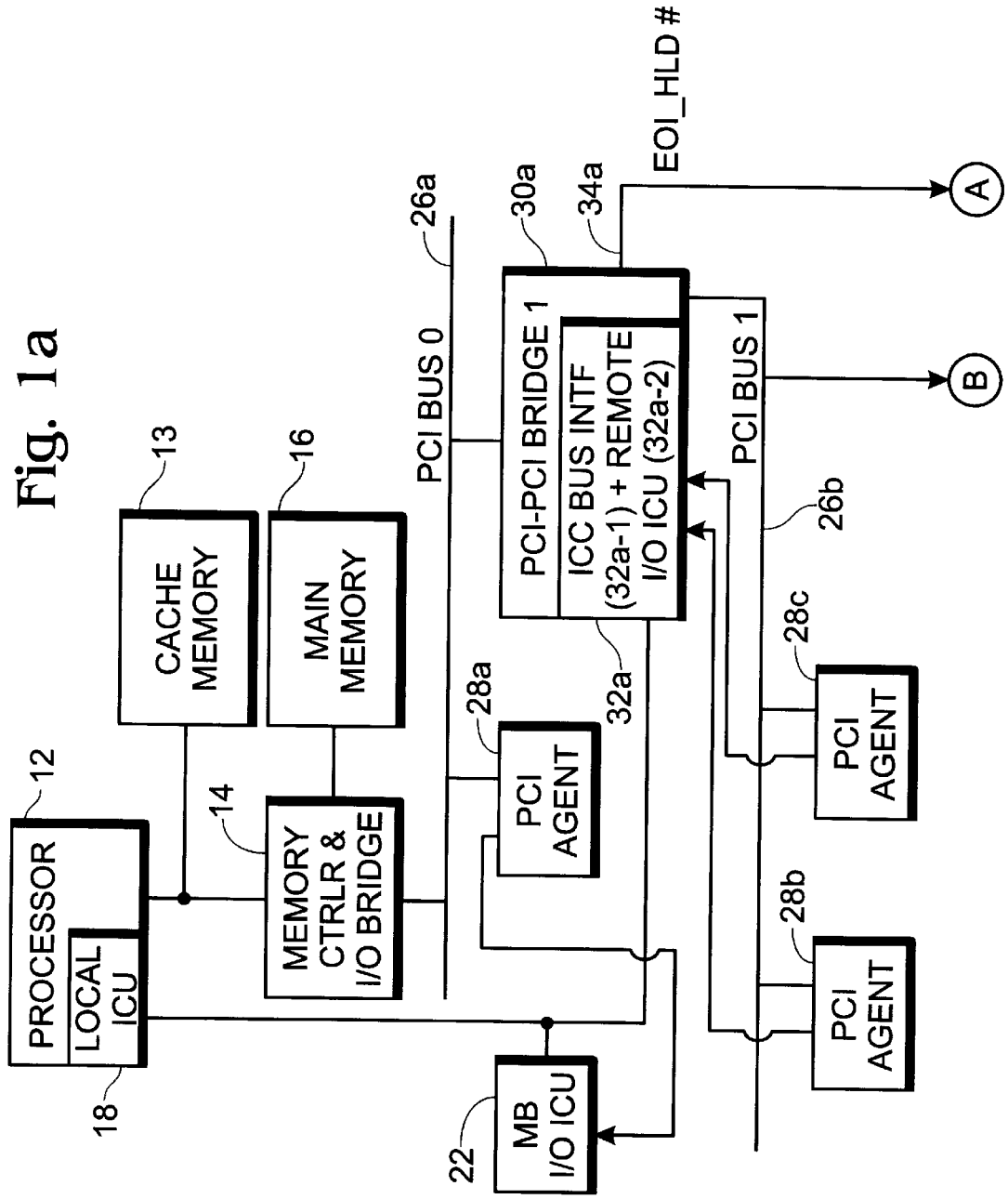

METHOD AND APPARATUS FOR INTERRUPTING A PROCESSOR BY A PCI PERIPHERAL ACROSS AN HIERARCHY OF PCI BUSES

BACKGROUND OF THE INVENTION

1. Field of the Invention

The present invention relates to the field of computer systems. More specifically, the present invention relates to the art of delivering interrupts to a processor of a computer system.

2. Background Information

The advent of graphics-oriented operating system such as Windows™ and OS/2 have created a data bottleneck between the processor and its display peripherals in standard Personal Computer (PC) input/output (I/O) architectures. As a result, PC designers have started using "local buses" to move peripheral functions with high bandwidth requirements closer to the system's processor bus to improve system performance. Particular examples of peripheral functions with high bandwidth requirements include graphical displays, full motion video etc.

Among the various "local bus" designs, because of its price performance balance, the Peripheral Component Interconnect (PCI) local bus has emerged as one of the most popular local bus designs employed by PC vendors. However, because of this price-performance balance, the number of PCI agents that can be coupled to a PCI bus is limited. As a result, as the number of high performance functions increases, PC vendors begin to employ multiple PCI buses. Today, it is no longer uncommon for high performance PCs to have an hierarchy of PCI buses interconnected by PCI—PCI bridges.

Beside the limitation on the number of PCI agents that can be coupled to a PCI bus, the price-performance balance also limits the number of unique interrupts that can be asserted. Ultimately, all interrupts triggered by the lower level PCI agents have to be mapped to the finite number of unique interrupts available to the PCI bus closest to the processor. Obviously, increasing amount of granularity is being lost as the level of PCI buses increases. Thus, it is desirable if an alternative low cost approach to delivering interrupts to the processor can be found[1].

[1]For more detailed descriptions of the PCI local bus and PCI—PCI Bridge, refer to the PCI Local Bus Specification and the PCI to PCI Bridge Architecture Specification respectively, both published by the PCI Special Interest Group, Hillsboro, Oreg.

In recent years, as the processing power of microprocessors continue to increase, microprocessor based server designers have become increasingly interested in designing multi-processor systems. As a result, a number of techniques for delivering interrupts in a multi-processor system have emerged. Among these techniques is a distributed approach, which calls for local interrupt controller units (ICU) for correspondingly interfacing to the processors, and I/O ICUs for interfacing with the I/O peripherals. The local ICUs and the I/O ICUs will communicate with each other through an interrupt controller communication (ICC) bus. The number of unique interrupts that can be delivered in this manner is virtually limitless. However, because of the requirement of the distributed ICUs to communicate with each other via the ICC bus, the I/O ICUs (and therefore the coupled I/O peripherals) cannot be physically too far away from the ICC bus. Thus, limiting the distributed approach's applicability to a large number of "remote" I/O peripherals[2].

[2]For more detailed description of the distributed approach, see Multiprocessor Specification, published by Intel Corp. of Santa Clara, Calif.

As will be disclosed in more details below, the present invention advantageously leverages on the strength of the PCI buses and the distributed ICU approach, and achieves the desired result of a low cost and yet highly flexible approach to delivering interrupts to a processor, as well as other desirable results which will be apparent to those skilled in the art.

SUMMARY OF THE INVENTION

A number of remote I/O ICUs, enhanced PCI—PCI bridges, and an ICC bus interface unit are distributively provided to a computer system having a processor and an hierarchy of PCI buses for facilitating PCI agents coupled to the lower level PCI buses to interrupt the processor during operation. The remote I/O ICUS, the enhanced functions of the PCI—PCI bridges, and the ICC bus interface unit advantageously leverage the PCI—PCI bridges' conventional ability in handling PCI type 1 configuration write transactions, to facilitate interrupt delivery and end of interrupt notification, by employing two specially defined PCI type 1 configuration write transactions[3], one for interrupt messages and another for end-of-interrupt (EOI) messages.

[3]Note, the specially defined type 1 configuration write transactions are similar but not to be confused with the Special Cycles defined by the PCI Specification.

For delivering interrupts to the processor, the remote I/O ICUs handles the generation of the special interrupt message PCI type 1 configuration write transactions for the interrupting PCI agents. The enhanced PCI—PCI bridges handle any necessary upstream forwarding to the ICC bus interface unit for the remote I/O ICUs. The ICC bus interface unit handles the actual delivery to a local ICU coupled to or integrated with the processor.

For EOI notification, the ICC bus interface unit handles the generation of the special EOI message PCI type 1 configuration write transactions for the local ICU. The enhanced PCI—PCI bridges handle any necessary downstream broadcasting to inform the remote I/O ICUs.

Additionally, in one embodiment, the PCI—PCI bridges are also enhanced to enforce interrupt ordering, in the event the computer system operates with write posting enabled.

BRIEF DESCRIPTION OF DRAWINGS

The present invention will be described by way of exemplary embodiments, but not limitations, illustrated in the accompanying drawings in which like references denote similar elements, and in which:

FIGS. 1a–1b illustrate an exemplary computer system incorporated with the teachings of the present invention;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, in describing the method steps of the present invention, certain operations are described with multiple method steps, however, unless specifically described, it should not be construed that these method steps are necessarily ordered dependent in their performance.

Figure 1B:
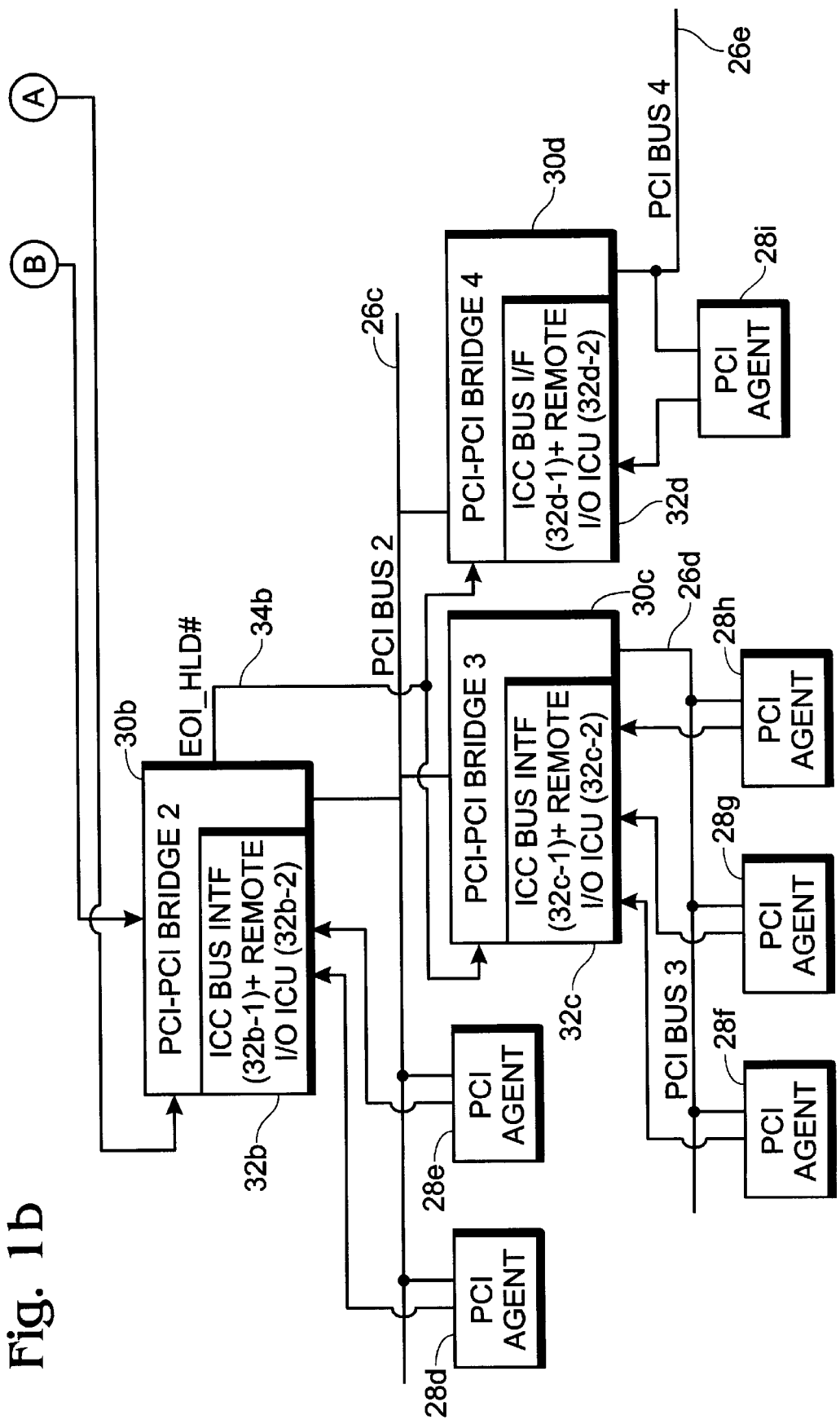

Referring now to FIGS. 1a–1b, wherein an exemplary computer system incorporated with the teachings of the present invention is shown. Exemplary computer system 10 includes processor 12, cache memory 13, memory controller and I/O bridge 14, and memory 16, coupled to each other as shown. Processor 12 includes local ICU 18, and exemplary computer system 10 further includes ICC bus 20 and motherboard (MB) I/O ICU 22, coupled to each other and local ICU 18 as shown. Exemplary computer system 10 further includes an hierarchy of PCI buses 26a–26e, enhanced PCI—PCI bridges 30a–30d, and PCI agents 28a–28i coupled to each other and to the previously enumerated elements as shown. Enhanced PCI—PCI bridges 30a–30d are incorporated with combined ICC bus interface and remote I/O ICU units 32a–32d. (Hereinafter, for clarity, ICC bus interface will be referred as 32a-1, 32a-1 etc. while remote I/O ICUs will be referred as 32a-2, 32b-2 etc.) As will be explained in more detail below, only ICC bus interface 32a-1 of combined unit 32a incorporated in PCI—PCI bridge1 30a, the "top" bridge, is enabled; all other ICC bus interfaces 32b-1, 32c-1 etc. of combined units 32b, 32c etc. incorporated in PCI—PCI bridges 30b, bridge3 30c etc., the "lower level" bridges, are disabled. In addition to their interconnections through the PCI bus hierarchy, PCI—PCI bridges 30a–30d are also coupled to each other for at least one "side band" communication 34a–34b as shown.

Processor 12 including its local ICU 18, cache memory 13, memory controller 14, memory 16, ICC bus 20, and MB I/O ICU 22 all perform their conventional functions known in the art, and will not be further described. Combined ICC bus interface and remote I/O ICUs 32a–32d and the enhanced functions of PCI—PCI bridges 30a–30d are used to facilitate interrupting processor 12 by remote PCI agents 28b–28i, using interrupt messages, and leveraging on the conventional ability of PCI—PCI bridges 30a–30d to handle PCI type 1 configuration write transactions. PCI—PCI bridges 30a–30d perform their conventional functions, as well as upstream routing of interrupt messages, and downstream routing of EOI messages, both in the form of specially defined PCI type 1 configuration write transactions. In one embodiment, PCI—PCI bridges 30b–30d also maintain interrupt order in the event processor 12 operates system 10 with write posting enabled. All these and other aspects of the present invention will be described more fully below. Except for the fact that the remote PCI agents 28b–28i exploit the interrupt facilities provided by the present invention, PCI agents 28a–28i are otherwise intended to represent a broad category of PCI agents known in the art.

Before we proceed to explain the present invention in further detail, it should be noted that while for ease of explanation, the present invention is being described with the illustrated embodiment having the ICC bus interface and the remote I/O ICU combined, and the combined units correspondingly integrated into the PCI—PCI bridges, from the description to follow, those skilled in the art will appreciate that the present invention may be practiced with the ICC bus interface, and the remote I/O ICUs distributively packaged in a variety of combined or standalone manners.

Additionally, the present invention may be practiced on computer systems with some of the enumerated functions packaged differently. For examples, local ICU 18 may be packaged separately from processor 12, and any one of the PCI—PCI bridges 30a–30d may be integrated with other components, such as an I/O controller. The present invention may also be practiced without some of the enumerated elements or with other additional elements. In particular, the present invention may be practiced with only one "lower level" PCI—PCI bridge incorporated with the teachings of the present invention, i.e. without remote PCI—PCI bridges 30c–30d and subordinated buses 26d–26e and agents 28f–28i, or with many more "lower level" PCI—PCI bridges incorporated with the teachings of the present invention, coupled to each other and the illustrated PCI—PCI bridges 30a–30d successively and/or in parallel. It is anticipated for embodiments having many more "lower level" PCI—PCI bridges and their subordinated buses and agents, one or more of these "lower level" PCI—PCI bridges and their subordinates buses and agents are physically disposed in one or more chassis' physically separated from the main system unit chassis.

Figure 2:
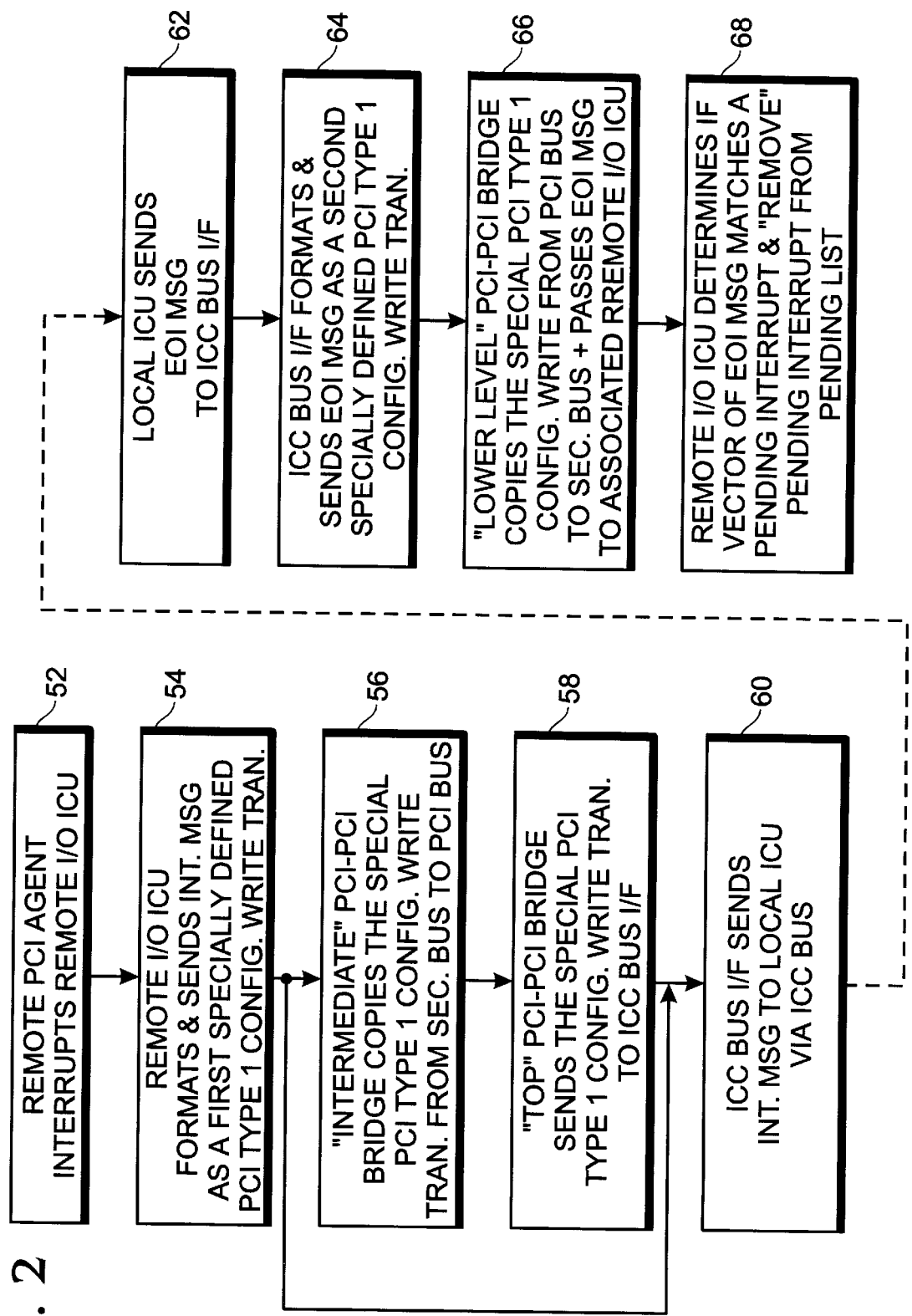
FIG. 2 illustrates the method steps of the present invention.

Referring now to FIGS. 1a–1b and 2, in accordance to the teachings of the present invention, a remote PCI agent, e.g. 28a or 28f interrupts processor 12 by interrupting the corresponding remote I/O ICU, i.e. 32a-2 or 32c-2, step 52. In response, if interrupt is not disabled for remote PCI agent 28a or 28f (as may be in the case of interrupt sharing) the corresponding remote I/O ICU 32a-2 or 32c-2 generates an interrupt message on behalf of the remote PCI agent 28a or 28f, step 54[4]. In the case of remote I/O ICU 32a-2, who is associated with PCI—PCI bridge1 30a, the "top" PCI—PCI bridge, remote I/O ICU 32a-2 provides the interrupt message to ICC bus interface 32a-1 directly. However, in the case of remote I/O ICU 32c-2, who is associated with PCI—PCI bridge3 30c, a "lower level" PCI—PCI bridge, remote I/O ICU 32c-2 formats and sends the interrupt message as a first specially defined PCI type 1 configuration write transaction (hereinafter simply transaction). The specially defined interrupt message transaction is placed onto PCI bus2 26c through PCI—PCI bridge3 30c, the incorporating PCI—PCI bridge.

[4]If interrupt is disabled, remote I/O ICU 32a-2 or 32c-2 holds the interrupt request until interrupt is enabled again.

Once placed on PCI bus2 26c, PCI—PCI bridge2 30b detects the presence of the specially defined interrupt message transaction. PCI—PCI bridge2 30b, treats the transaction like any other PCI type 1 configuration write transactions, forwards the transaction upstream (since it is a "lower level" PCI—PCI bridge), by copying the transaction from PCI bus2 26c, its secondary bus, to PCI bus1 26b, its primary bus, step 56. Next, PCI—PCI bridge1 30a detects the presence of the specially defined interrupt message transaction on PCI bus1 26b. However, in accordance to the present invention, PCI—PCI bridge1 30a, treats the transaction differently from other "normal" PCI type 1 configuration write transactions, forwards the transaction to ICC bus interface 32a-1 instead (since it is the "top" PCI—PCI bridge), step 58. Additionally, PCI—PCI bridge1 30a may also copy the specially defined interrupt message transaction onto PCI bus0 26a, its primary bus.

Upon receipt of the interrupt message, either directly or indirectly through the bus hierarchy, in the form of the specially defined interrupt message transaction, ICC bus interface 32a-1 sends the interrupt message to local ICU 18 via ICC bus 20, thereby interrupting processor 12 on behalf of the "originating" PCI agent 28b or 28f, step 60. In the case where the interrupt message is received indirectly through the bus hierarchy, in the form of the specially defined interrupt message transaction, ICC bus interface 32a-1 converts the transaction back to an interrupt message, before sending the interrupt message to local ICU 18.

Back at step 54, when PCI—PCI bridge3 30c places the specially defined interrupt message transaction on PCI bus2 26c, PCI—PCI bridge4 30d will also detect the presence of the transaction on PCI bus2 26c. However, because PCI bus2 26c is the primary bus of PCI—PCI bridge4 30d, in accordance to the present invention, PCI—PCI bridge4 30d ignores the transaction's presence.

All PCI—PCI bridges 30a–30d are enhanced in like manners. Thus, if there is another "lower level" PCI—PCI bridge coupled to PCI—PCI bus3/bus4 26d/26e, placing a specially defined interrupt message PCI type 1 configuration write transaction on PCI bus3/bus4 26d/26e, PCI—PCI bridge3/bridge 4 30c/30d would detect the transaction, and forward the transaction upstream, by copying the transaction from PCI bus3/bus4 26d/26e, its secondary bus, to PCI bus2 26c, its primary bus. The transaction would then be detected by PCI—PCI bridge2 30b and PCI—PCI bridge4/bridge3 30d/30c. PCI—PCI bridge2 30b would forward the transaction upstream, while PCI—PCI bridge4/bridge3 30d/30c would ignore the transaction, as described earlier. The transaction would then be detected by PCI—PCI bridge1 30a, provided to ICC bus interface 32a-1, and in turn to local ICU 18. In other words, regardless of the depth of the PCI bus hierarchy, and at which level a specially defined interrupt message transaction is placed onto one of the "lower level" PCI bus, in due course, the transaction would be detected by PCI—PCI bridge1 30a, provided to ICC bus interface 32a-1, and in turn, local ICU 18.

Processor 12 handles the interrupt, and eventually responds with an EOI message (for level sensitive interrupts) through local ICU 18 as in the prior art, step 62. Upon receipt of an EOI message, ICC bus interface 32a-1 provides the EOI message to remote I/O ICU 32a-2, as well as formats the EOI message into a second specially defined PCI type 1 configuration write transaction, and broadcast the transaction downstream to remote I/O ICUs 32b-2, 32c-2, etc., through the PCI bus hierarchy, step 64.

To facilitate downstream broadcasting of EOI messages, in the form the second specially defined transaction, each "lower level" PCI—PCI bridge 30b–30d maintains a sideband communication signal EOI_HLD# to inform the ICC bus interface 32a-1 and the "intermediate" PCI—PCI bridges (such as PCI—PCI bridge2 30b), whether the "lower level" PCI—PCI bridges (such as PCI—PCI bridge3 30c) are ready to receive an EOI message or not. In one embodiment, a "lower level" PCI—PCI bridge informs the ICC interface unit 32a-1, or an "intermediate" PCI—PCI bridge that it is ready to accept an EOI message, by deasserting EOI_HLD#. If the "lower level" PCI—PCI bridge is not ready to accept an EOI message, it asserts EOI_HLD#. In this embodiment, EOI_HLD# is an open collector signal shared by all PCI—PCI bridges on a single PCI bus, with the "higher level" PCI—PCI bridge receiving that copy of EOI_HLD# as input, and the "lower level" bridge(s) driving the same copy as an output.

Thus, upon determining that PCI—PCI bridge2 30b is ready to handle EOI broadcast, ICC bus interface 32a-1 places the specially defined EOI message transaction on PCI bus1 26b, step 64. Then, PCI—PCI bridge2 30b detects the transaction, copies the transaction from PCI bus1 26b, its primary bus, and forwards the transaction to remote I/O ICU 32b-2. Additionally, upon determining that PCI—PCI bridge3 and bridge4 30c–30d, its "immediately lower level" PCI—PCI bridges, are ready to accept an EOI message, PCI—PCI bridge2 30b places the transaction onto PCI bus2 26c for downstream broadcasting, step 66. Next, PCI bridge3 and bridge4; 30c–30d detect the transaction, copy the transaction, and provide it to remote I/O ICU 32c-2 and 32d-2 respectively. Additionally, PCI bridge3 and bridge4 30c–30d may also copy the specially defined EOI message transaction onto PCI bus3 26d and PCI bus4 26e respectively.

Upon receiving the EOI message, each remote I/O ICU 32a-2–32d-2 determine if the EOI message requires action, by decoding the associated interrupt vector identification, and matching the decoded interrupt vector identification against the identifications of their respective pending interrupts, step 68. For the "lower level" remote I/O ICUs 32b-2–32d-2, who receives the EOI message in the form of the specially defined EOI message transaction, remote I/O ICUs 32b-2–32d-2 further converts the specially defined EOI message transaction back into the EOI message.

Again, since all PCI—PCI bridges are enhanced in like manners. If there are additional PCI—PCI bridges coupled to PCI bus3/bus4 26d/26e, and inform PCI bridge3/bridge4 30c/30d that they are ready to accept an EOI message, PCI bridge3/bridge4 30c/30d will place a copy of the specially defined EOI message transaction on PCI bus3/bus4 26d/26e. The additional PCI—PCI bridges in turn will detect the transaction and forward the EOI message to their associated remote I/O ICUs. In other words, regardless the depth of the PCI bus hierarchy, and at which level a remote I/O ICU is associated with a PCI—PCI bridge, in due course, the remote I/O ICU will be notified of an EOI message being broadcast downstream from ICC bus interface 32a-1.

Back at step 64, when PCI—PCI bridge2 30b places the specially defined EOI message transaction on PCI bus2 26c, by virtue of the "special nature" of the transaction, none of the other coupled PCI agents 28d–28e will assert a "device select". Each "broadcasting" PCI—PCI bridge, in this case PCI bridge2 30b, is responsible for terminating the broadcast on its secondary bus by "aborting" the transaction. Since the abort is an expected result, it will not produce errors on any PCI compliant devices.

In one embodiment, in response to each EOI message, regardless of whether the remote I/O ICU is an "originating" remote I/O ICU or not, each remote I/O ICU responds with interrupt messages for any pending level sensitive interrupts to ensure the pending level sensitive interrupts are not lost. For such an embodiment, the PCI—PCI bridges 30a–30d are further enhanced to maintain interrupt order, in the event processor 12 operates system 10 with write posting enabled, to be more fully described later.

Figure 3:
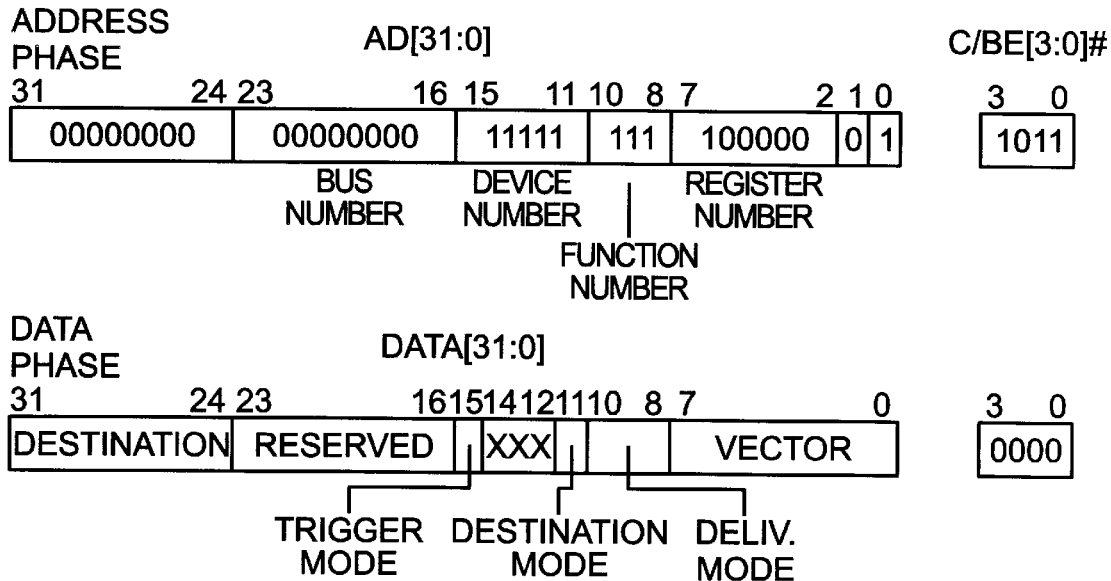
FIGS. 3–4 illustrate the sending of an interrupt message, and the return of an EOI message as specially defined PCI type 1 configuration write transactions.

FIG. 3 illustrates the manner in which a remote I/O ICU 32b-2–32d-2 formats and sends out an interrupt message as the first specially defined PCI type 1 configuration write transaction. As shown, during the address phase, the command bits (C/BE[3:0]#) are set to "1011", denoting configuration write. Address (AD) [1:0] are set to "01", denoting "type 1". Additionally, AD[15:11], AD[10:8], and AD[7:2] are set to a predetermined device number, a predetermined function number and a predetermined register number respectively. Collectively, they denote the fact that the PCI type 1 configuration write transaction is a specially defined transaction for sending interrupt messages. For the illustrated embodiment, the predetermined device, function, and register numbers are "11111b", "111b" and "100000b" respectively. AD[23:16] is set to the primary bus number of the "top" PCI—PCI bridge. For the illustrated embodiment, AD[23:16] is set to "0000 0000", denoting PCI bus0 26a. AD[31:24] are not used.

During the data phase, C/BE[3:0]# is set to "0000". The interrupt vector ID is stored in Data[7:0], whereas the logical destination is stored in Data[31:24]. Additionally, the trigger, destination, and delivery modes are set in Data[15], Data[11] and Data [10:8] respectively. Data [14:12] are set to zeroes, whereas Date[23:16] are not used. For more detailed description of these fields, refer to the above identified Multiprocessor Specification.

Figure 4:
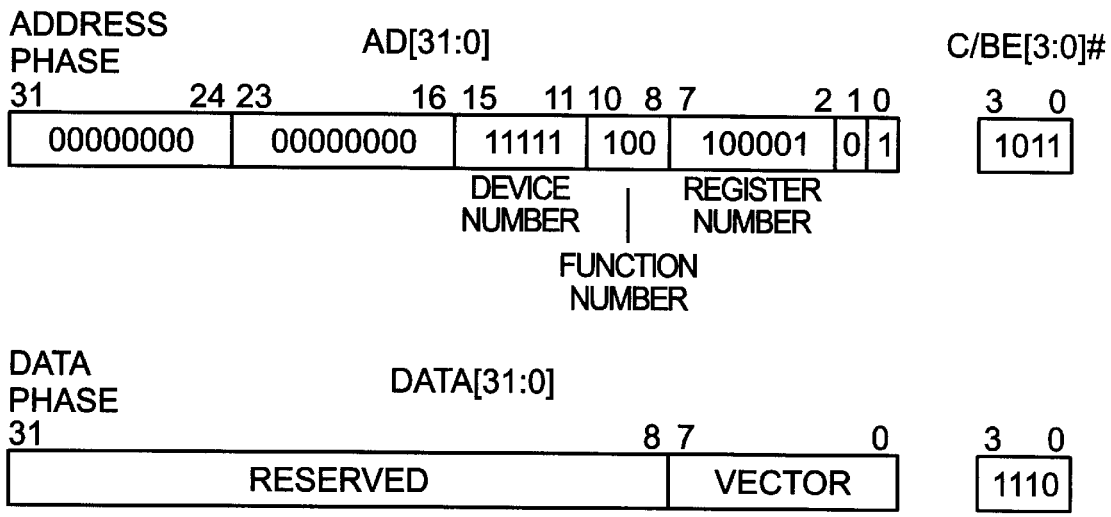

FIG. 4 illustrates the manner in which ICC bus interface 32a-1 formats and sends out an EOI message as a specially defined PCI type 1 configuration write transaction. As shown, during the address phase, the command bits (C/BE [3:0]#) are set to "1011", denoting configuration write. Address (AD) [1:0] are set to "01", denoting "type 1". Additionally, AD[15:11], AD[10:8], and [7:2] are set to a predetermined device number, a predetermined function number and a predetermined register number respectively. Collectively, they denote the fact that the type 1 configuration write transaction encodes an EOI message. For the illustrated embodiment, the predetermined device, function, and register numbers are "1111b", "100b" and "100001b" respectively. AD[31:16] are not used. AD[23:16] are set to an arbitrary constant, for the illustrated embodiment, zeroes. During the data phase, C/BE[3:0]# is set to "0000". The interrupt vector ID is stored in Data[7:0]. Data [31:8] are not used.

Figure 5:
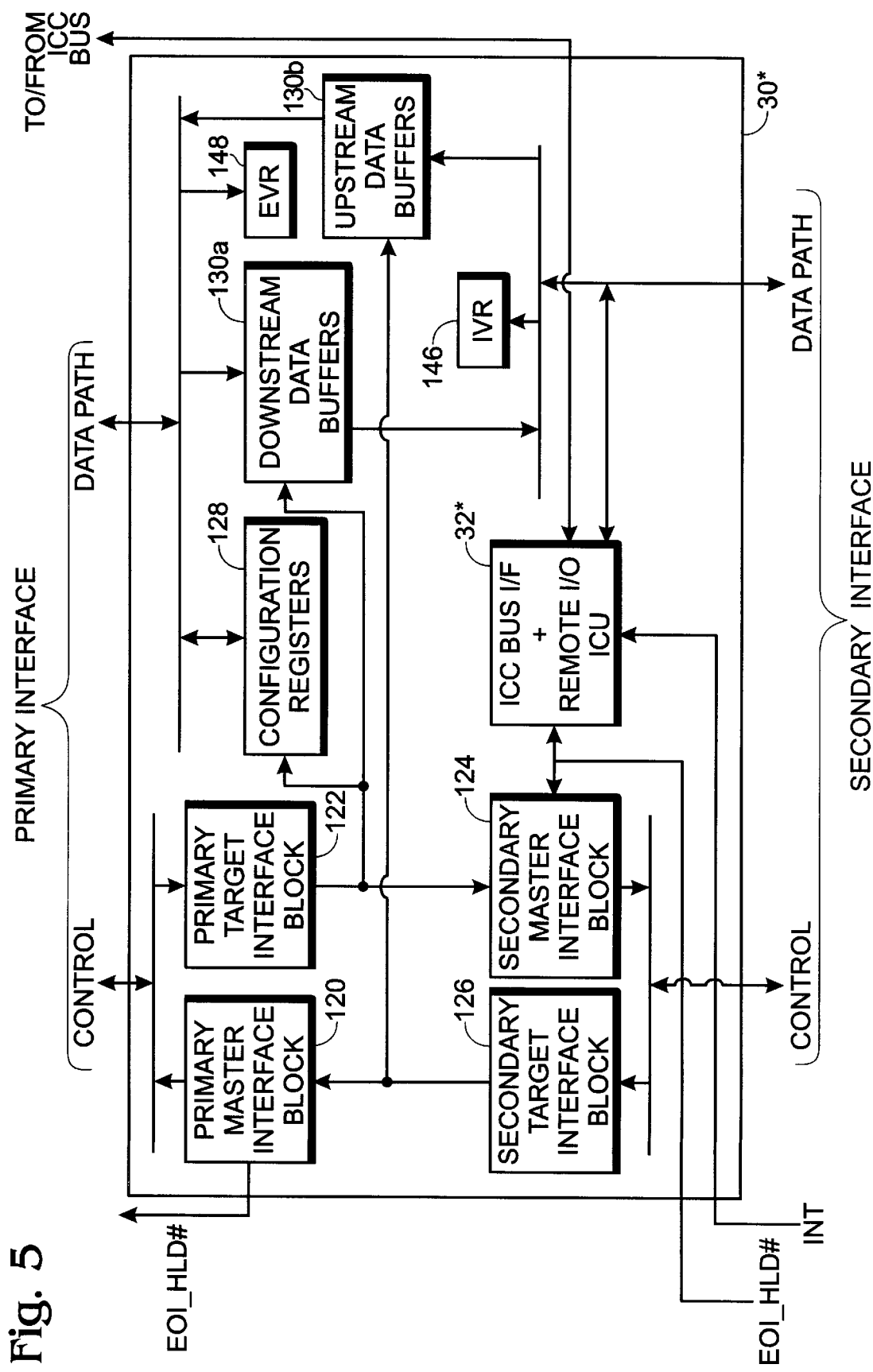
FIG. 5 illustrates a preferred embodiment of the integrated Remote I/O ICU, ICC Bus Interface and PCI—PCI bridge of FIG. 1.

FIG. 5 illustrates one embodiment of an enhanced PCI—PCI bridge in accordance to present invention. As described earlier, in the presently preferred embodiment, all PCI—PCI bridges 30a–30d are constituted and enhanced in like manners. Each of the PCI—PCI bridges 30a–30d (hereinafter 30*) comprises primary master interface block 120, primary target interface block 122, secondary master interface block 124, and secondary target interface block 126, coupled to each other as shown. PCI—PCI bridge 30* also includes configuration registers 128 and data buffers 130a–130b, coupled to each other and to the above enumerated elements as shown. Configuration registers 128 include sufficient numbers of register to allow a first register to be used as a control register (not shown). Preferably, at least one bit in the control register is used to denote whether the routing of interrupt messages in accordance to the present invention is enabled or not.

Additionally, in accordance to the presently preferred embodiment of the present invention, a combined ICC bus interface and remote I/O ICU unit 32a, 32b, 32c, or 32d (hereinafter 32*) is incorporated with each PCI—PCI bridge 30*. As described earlier, the ICC bus interface function is only enabled when the incorporating PCI—PCI bridge of the combined unit 32* is the "top" PCI—PCI bridge. For all other combined units 32* whose incorporating PCI—PCI bridges are "lower level" PCI—PCI bridges, the ICC bus interface function is disabled.

Figure 7:
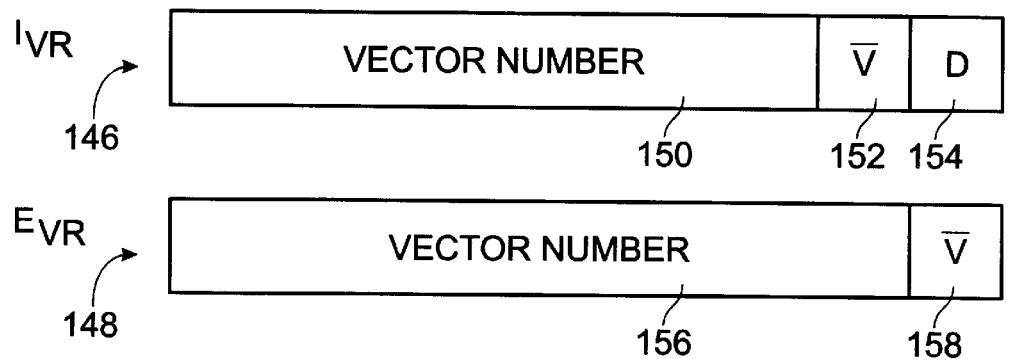
FIG. 7 illustrates the IVR and EVR registers of enhanced PCI—PCI bridge in further detail.

Furthermore, for the illustrated embodiment, two additional registers, interrupt vector register (IVR) and an EOI vector register (EVR), 146 and 148 are provided for maintaining interrupt ordering, in the event processor 12 operates computer system 10 with write posting enabled. Skipping now to FIG. 7, wherein IVR 146 and EVR 148 are illustrated in further detail. As shown, IVR 146 includes vector number 150, invalid bit 152, and discard bit 154, whereas EVR 148 includes vector number 156 and invalid bit 158. Vector numbers 150 and 156 identify the "current" interrupt message being forwarded upstream and the "current" EOI message being broadcast downstream by the particular PCI—PCI bridge 30* respectively. In other words, for the illustrated embodiment, at most only one interrupt message and one EOI message is buffered by the primary and secondary master interface blocks 120 and 124 at a time. Invalid bits 152 and 158 are cleared (denoting valid) when the corresponding interrupt and EOI messages are received, and set (denoting invalid) when the corresponding interrupt and EOI messages are forwarded upstream/broadcast downstream. Discard bit 154, when cleared, denotes an interrupt message will actually be forwarded upstream, and if set, denotes an interrupt message is not to be forwarded upstream (for the purpose of maintaining message ordering). Discard bit 154 is set whenever vector numbers 150 and 156 match each other, and both invalidity bits 152 and 158 are cleared.

Referring back now to FIG. 5, In addition to the standard PCI control signals received and provided through the primary and secondary buses respectively, primary master interface block 120 also provides at least one side band communication (EOI_HLD#) to its "immediately higher level" PCI—PCI bridge 30*, whereas secondary master interface block 124 also receives at least one side band communication (EOI_HLD#) from its "immediately lower level" PCI—PCI bridge(s) 30*. The EOI_HLD# received from the "immediately lower level" PCI—PCI bridge(s) 30* is also provided to the combined ICC bus interface and remote I/O ICU unit 32*.

Primary master interface block 120, primary target interface block 122, secondary master interface block 124, and secondary target interface block 126, perform their conventional functions as specified by the above identified PCI—PCI Bridge Architecture Specification. Additionally, primary master interface block 120, in cooperation with secondary master interface block 124, extend the conventional type 1 to type 1 forwarding function to include forwarding upstream type 1 transaction where the register number equals the predetermined register address for facilitating routing of interrupt message (e.g. "20x"), provided the other conventional conditions are met, and if implemented, routing of interrupt message is enabled, and invalid and discard bits 152–154 are cleared[5]. Secondary master interface block 124, in cooperation with primary master interface block 120, also extend the conventional type 1 to type 1 forwarding function to include forwarding downstream type 1 transaction where the register number equals the predetermined register address for facilitating routing of EOI messages (e.g. "21x"), provided the other conventional conditions are met, and if implemented, routing of interrupt message is enabled and EOI_HLD# from the "immediately lower level" bridge(s) is deasserted[6].

[5]Normally, type 1 transactions are forwarded upstream only if the register number is zero, plus a number of other conditions. The other conditions are specified in the PCI—PCI Bridge Architecture Specification.
[6]Normally, type 1 transactions are forwarded downstream only if the register number is zero, plus a number of other conditions. The other conditions are also specified in the PCI—PCI Bridge Architecture Specification.

Furthermore, primary master interface block 120 and secondary master interface block 124 set and clear the various fields of IVR and EVR 146 and 148. The primary master interface block 120 deasserts EOI_HLD# for the "immediately higher level" PCI—PCI bridge 30* whenever invalid bit 158 is set, and asserts EOI_HLD# for the "immediately higher level" PCI—PCI bridge 30* whenever invalid bit 158 is cleared.

Figure 6:
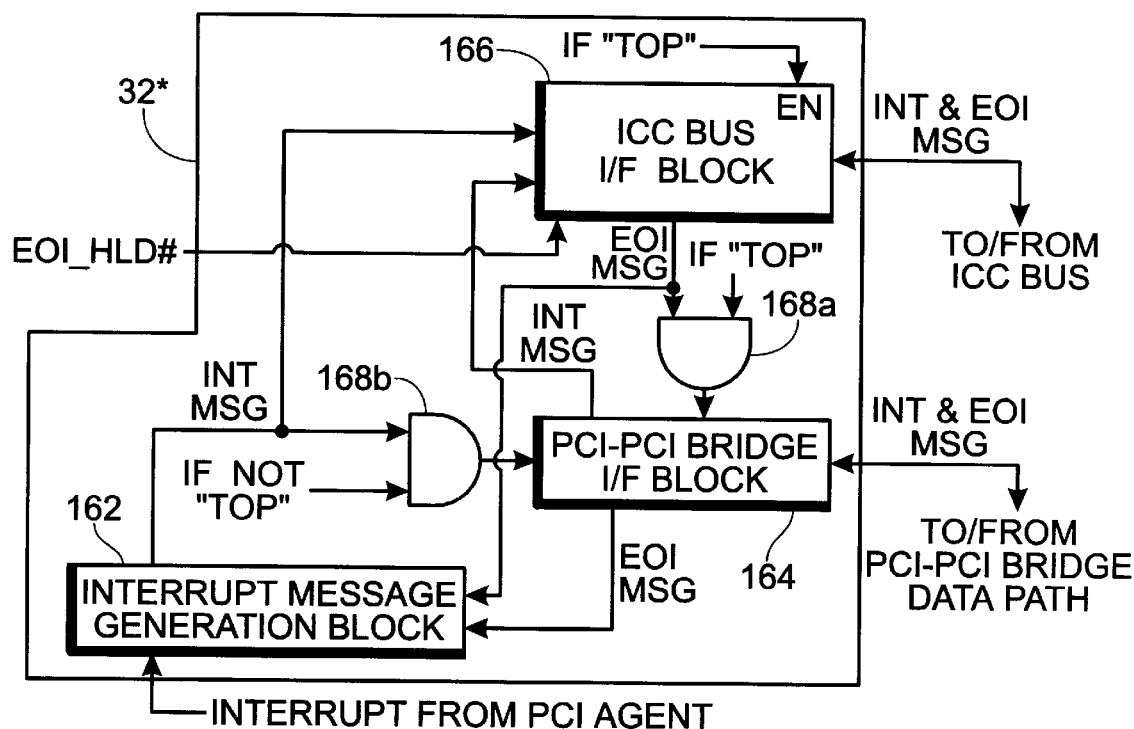
FIG. 6 illustrates a preferred combined embodiment of ICC Bus Interface and Remote I/O ICU.

FIG. 6 illustrates a preferred embodiment of the combined

ICC bus interface and remote I/O ICU unit 32*. As shown, combined unit 32* includes interrupt message generation block 162, PCI—PCI bridge interface block 164 and ICC bus interface block 166. Additionally, combined unit 32* includes AND gates 168a and 168b. The enumerated elements are coupled to each other as illustrated. The function of the ICC bus interface 32a-1 is implemented in ICC bus interface block 166 and PCI—PCI bridge interface block 164, whereas the remote I/O ICU function **32*-2 is implemented in interrupt message generation block 162 and PCI—PCI bridge interface block 164**.

ICC interface block 166 is enabled only if combined unit 32* is incorporated into the "top" PCI—PCI bridge. Similarly, a logic one is provided to AND gate 168a only if combined unit 32* is incorporated into the "top" PCI—PCI bridge. However, for AND gate 168b, a logic one is provided only if combined unit 32* is incorporated into a "lower level" PCI—PCI bridge. In one embodiment, whether a PCI—PCI bridge is the "top" bridge or a "lower level" bridge is denoted through hardware strapping. Effectively, combined unit 32* functions with the ICC bus interface 32a-1 only if the incorporating PCI—PCI bridge is the "top" bridge. However, by combining the functions, uniformly incorporating the combined functions into the PCI—PCI bridges, and then selectively enabling the functions depending on the relative position of the PCI—PCI bridges, there is only one "standard" part to manufacture, thereby improving manufacturing efficiency.

As shown, interrupt message generation block 162 generates interrupt messages in response to interrupts asserted by the coupled PCI agents 28b, 28c, etc. (hereinafter 28*), if interrupt is enabled. Interrupt message generation block 162 also tracks interrupts generated, as well as pending interrupts. Each generated interrupt message is provided to ICC bus interface block 166, however it is being acted on only if ICC bus interface block 166 is enabled (when the incorporating PCI—PCI bridge 30* is the "top" PCI—PCI bridge). Each generated interrupt message is also provided to AND gate 168b, which in turn is provided to PCI—PCI bridge interface block 164 if AND gate 168b receives a logic one for its other input (when the incorporating PCI—PCI bridge 30* is a "lower level" PCI—PCI bridge).

In the first case where ICC bus interface block 166 is enabled ("top" bridge), as described earlier, the interrupt message is forwarded to local ICU 18 via ICC bus 20, thereby interrupting processor 12 on behalf of the interrupting PCI agent 28b or 28c. In the second case where ICC bus interface block 166 is not enabled (a "lower level" bridge), and AND gate 168b is provided with a logic one as the other input, PCI—PCI bridge interface block 164 receives the interrupt message, and in turn formats the interrupt message into the first specially defined transaction, places the transaction on the primary bus of the incorporating PCI—PCI bridge 30* through the upstream data path.

PCI—PCI interface block 164 also receives these first specially defined PCI type 1 configuration write transactions from the incorporating PCI—PCI bridge's upstream datapath (when the incorporating PCI—PCI bridge is the "top" PCI—PCI bridge). PCI—PCI interface block 164 converts the transaction back into an interrupt message and forwards the interrupt message to ICC bus interface block 166, which is enabled, and in turn forwards the interrupt message to local ICU 18 as described earlier.

ICC bus interface block 166 also receives EOI messages from local ICU 18 (when the incorporating PCI—PCI bridge is the "top" PCI—PCI bridge), in which case, ICC bus interface block 166 is enabled, who in turn broadcast the EOI message downstream if EOI_HLD# is deasserted. The EOI message is provided to interrupt message generation block 162 for generation of pending level sensitive interrupts that are still active, as well as provided to AND gate 168a, who will be receiving a logic one for its other input, thereby causing the EOI message to be provided to PCI—PCI bridge interface block 164. In response, PCI—PCI interface block 164 formats the EOI message into the second specially defined PCI type 1 configuration write transaction, and places the transaction on the secondary bus of the "top" PCI—PCI bridge through its downstream datapath.

PCI—PCI bridge interface block 164 also receives EOI messages in the form of the second specially defined transaction (when the incorporating PCI—PCI bridge is a "lower level" PCI—PCI bridge 30). In response, PCI—PCI bridge interface block 164 converts the transaction back into an EOI message and forwards it to interrupt message generation block 162, who in turn matches the vector of the EOI message against the pending interrupts, and removes any matching interrupt. As described earlier, interrupt message generation block 162 also generates any pending level sensitive interrupts that are still active.

Thus, a method and apparatus for interrupting a processor by a PCI peripheral across an hierarchy of PCI buses has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer system comprising:
   (a) a processor, a plurality of peripheral component interconnect (PCI) agents, and a plurality of PCI—PCI bridges;
   (b) a local interrupt controller unit (ICU) associated with the processor to interrupt the processor in response to received interrupt messages;
   (c) an interrupt controller communication (ICC) bus coupled to the local ICU to deliver interrupt messages to the local ICU;
   (d) an hierarchy of PCI buses coupled to the processor to couple the plurality of PCI agents to the processor, the PCI buses being interveningly interconnected by the PCI—PCI bridges;
   (e) a plurality of remote ICUs coupled to the PCI agents, and correspondingly associated with the PCI—PCI bridges, to convert interrupts from the associated PCI agents to PCI transactions for delivery to the processor via the PCI buses; and
   (f) an ICC bus interface coupled to the ICC bus and to a top one of the PCI—PCI bridges to convert the PCI transactions back into interrupt messages and provide the interrupt messages to the ICC bus.

2. The computer system as set forth in claim 1, wherein the remote ICUs generate interrupt messages as PCI type 1 configuration write transactions of a specially defined kind.

3. The computer system as set forth in claim 2, wherein each of the PCI type 1 configuration write transactions of a specially defined kind has an identical predetermined device number, an identical predetermined function number, and an identical predetermined register number.

4. The computer system as set forth in claim 1, wherein a first of the remote ICUs is associated with the top PCI—

PCI bridge, and the first remote ICU and the ICC bus interface are jointly implemented in a single combined component.

5. The computer system as set forth in claim 4, wherein the single combined component is integrated with the top PCI—PCI bridge.

6. The computer system as set forth in claim 1, wherein
the processor returns end of interrupt (EOI) notifications at the end of servicing level sensitive interrupts;
the local ICU broadcasts to the ICC bus the EOI notifications as EOI messages;
the ICC bus delivers the EOI messages to the ICC bus interface;
the ICC bus interface converts the EOI messages and broadcasts the EOI messages downstream as PCI transactions through the PCI buses to the remote ICUs.

7. The computer system as set forth in claim 6, wherein the ICC bus interface broadcasts the EOI messages as PCI type 1 configuration write transactions of a specially defined kind.

8. The computer system as set forth in claim 6, wherein each of the PCI type 1 configuration write transactions of a specially defined kind has an identical predetermined device number, an identical predetermined function number, and an identical predetermined register number.

9. The computer system as set forth in claim 6, wherein the remote ICUs further track pending level sensitive interrupts originated from associated ones of the coupled PCI agents, and generate interrupt messages in like manner as PCI transactions for delivery to the processor via the PCI buses for any pending level sensitive interrupts that are still active.

10. The computer system as set forth in claim 9, wherein each PCI—PCI bridge further maintains interrupt ordering.

11. The computer system as set forth in claim 10, wherein each PCI—PCI bridge includes a first register to store at least a first interrupt vector identification and associated control information for an interrupt message, and a second register to store at least a second interrupt vector identification and associated control information for an EOI message, for maintaining interrupt ordering.

12. The computer system as set forth in claim 6, wherein each of the PCI—PCI bridges informs the immediately higher level PCI—PCI bridge of the PCI—PCI bridge whether the PCI—PCI bridge is ready to accept an EOI message.

13. The computer system as set forth in claim 12, wherein each one of the PCI—PCI bridges informs the immediately higher level PCI—PCI bridge of the PCI—PCI bridge whether the PCI—PCI bridge is ready to accept an EOI message by maintaining an out-of-band communication signal.

14. A computer system comprising:
(a) a processor, a plurality of peripheral component interconnect (PCI) agents, and a plurality of PCI—PCI bridges;
(b) a local interrupt controller unit (ICU) associated with the processor to interrupt the processor in response to received interrupt messages;
(c) an interrupt controller communication (ICC) bus coupled to the local ICU to deliver interrupt messages to the local ICU; and
(d) an hierarchy of PCI buses coupled to the processor to couple the plurality of PCI agents to the processor, the PCI buses being interveningly interconnected by the PCI—PCI bridges, wherein each PCI—PCI bridge includes a combined ICC bus interface and remote ICU block coupled to associated ones of the PCI agents to convert interrupts from the associated PCI agents to PCI transactions for delivery to the processor via the PCI buses if the PCI—PCI bridge is a lower level one of the PCI—PCI bridges, and to convert the PCI transactions back into interrupt messages and provide the interrupt messages to the ICC bus if the PCI—PCI bridge is a top one of the PCI—PCI bridges.

15. The computer system as set forth in claim 14, wherein the combined ICC bus interface and remote ICU blocks of the PCI—PCI bridges that are the lower level PCI—PCI bridges generate interrupt messages as PCI type 1 configuration write transactions of a specially defined kind.

16. The computer system as set forth in claim 14, wherein
the processor returns end of interrupt (EOI) notifications at the end of servicing level sensitive interrupts;
the local ICU broadcasts to the ICC bus the EOI notifications as EOI messages;
the ICC bus delivers the EOI messages to the ICC bus interface;
the combined ICC bus interface and remote ICU block of the top PCI—PCI bridge converts the EOI messages and broadcasts the EOI messages downstream as PCI transactions through the PCI buses to the combined ICC bus interface and remote ICU blocks of the lower level PCI—PCI bridges.

17. The computer system as set forth in claim 16, wherein the combined ICC bus interface and remote ICU block of the top PCI—PCI bridge broadcast the EOI messages as PCI type 1 configuration write transactions of a specially defined kind.

18. The computer system as set forth in claim 16, wherein the combined ICC bus interface and remote ICU blocks further track pending level sensitive interrupts originated from associated ones of the coupled PCI agents, and convert interrupt messages to PCI transactions for delivery to the processor via the PCI buses for any pending level sensitive interrupts that are still active.

19. The computer system as set forth in claim 18, wherein each PCI—PCI bridge includes a first register to store at least a first interrupt vector identification and associated control information for an interrupt message, and a second register to store at least a second interrupt vector identification and associated control information for an EOI message, for maintaining interrupt ordering.

20. The computer system as set forth in claim 16, wherein each one of the PCI—PCI bridges informs the immediately higher level PCI—PCI bridge of the PCI—PCI bridge whether the PCI—PCI bridge is ready to accept an EOI message by maintaining an out-of-band communication signal.

21. The computer system as set forth in claim 14, wherein each combined ICC bus interface and remote ICU block comprises:
an interrupt message generation block coupled to associated ones of the PCI agents to generate interrupt messages in response to interrupt requests from the associated ones of the PCI agents;
a PCI—PCI bridge interface block coupled to the interrupt message generation block and to a datapath of the integrating PCI—PCI bridge to conditionally converting the interrupt messages to PCI transactions and place the PCI transactions on the datapath, if the integrating PCI—PCI bridge is a lower level PCI—PCI bridge; and
a bus interface block coupled to the interrupt message generation block to conditionally output the interrupt messages if the integrating PCI—PCI bridge is the top PCI—PCI bridge.

22. The computer system as set forth in claim 21, wherein the ICC bus interface block is also conditionally coupled to the ICC bus to forward end of interrupt (EOI) messages from the local ICU if the integrating PCI—PCI bridge is the top PCI—PCI bridge; and the PCI—PCI bridge interface block is further coupled to the ICC bus interface block to conditionally convert the EOI messages to PCI transactions and place the PCI transactions on the datapath of the integrating PCI—PCI bridge, if the integrating PCI—PCI bridge is the top PCI—PCI bridge.

23. The computer system as set forth in claim 22, wherein the interrupt message generation block further tracks pending level sensitive interrupts originated by associated ones of the PCI agents, receives the EOI messages from either the interface block if the integrating PCI—PCI is the top PCI—PCI bridge, or from the PCI—PCI bridge interface block if the integrating PCI—PCI is a lower level PCI—PCI bridge, and generates interrupt messages for all pending level sensitive interrupts that are still active.

24. A method for interrupting a processor by a plurality of peripheral components, the method comprising the steps of:

(a) generating interrupt messages by the peripheral components;

(b) converting the interrupt messages to peripheral component interconnect (PCI) transactions by remote interrupt controller units (ICU);

(c) forwarding the PCI transactions upstream to a top PCI—PCI bridge of an hierarchy of PCI buses interconnected by intervening PCI—PCI bridges via the PCI buses;

(d) forwarding the PCI transactions to an interrupt controller communication (ICC) bus interface by the top PCI—PCI bridge;

(e) converting the PCI transactions back into interrupt messages, and providing the interrupt messages to a local ICU associated with the processor via an ICC bus by the ICC bus interface; and (f) interrupting the processor by the local ICU in response to the interrupt messages.

25. The method as set forth in claim 24, wherein the method further comprises the steps of:

(g) returning end-of-interrupt (EOI) notifications by the processor for level sensitive interrupts;

(h) forwarding the EOI notifications to the ICC bus interface as EOI messages by the local ICU;

(i) converting the EOI messages to PCI transactions by the ICC bus interface;

(j) broadcasting the EOI messages as PCI transactions for delivery to the remote ICUs via the PCI buses by the ICC bus interface;

(k) forwarding the PCI transactions downstream to the lower level PCI—PCI bridges; and (l) forwarding the PCI transactions to the remote ICUs by the lower level PCI—PCI bridges.

26. The method as set forth in claim 25, wherein step (j) further includes informing an immediately higher level PCI—PCI bridge by each lower level PCI—PCI bridge whether the lower level PCI—PCI bridge is ready to receive an EOI message; and the broadcasting from a higher level PCI—PCI bridge to all immediately lower level PCI—PCI bridges of step (j) is performed conditionally when all immediately lower level PCI—PCI bridges are ready to accept an EOI message.

27. The method as set forth in claim 26, wherein the method further comprises the steps of:

(m) tracking pending level sensitive interrupts by the remote ICUs;

(n) converting the PCI transactions back into EOI messages by the remote ICUs; and (o) in response to each EOI message, converting interrupt messages to PCI transactions for delivery to the processor via the PCI bus by the remote ICUs for any pending level sensitive interrupts that are still active.

* * * * *